United States Patent Office 3,080,328

Patented Mar. 5, 1963

3,080,328

CONDUCTING SOLDER GLASS COMPOSITIONS

Carroll J. Billian, Perrysburg, Ohio, assignor to Owens-Illinois Glass Company, a corporation of Ohio No Drawing. Filed May 22, 1961, Ser. No. 111,438
10 Claims. (Cl. 252—513)

This invention relates to new and improved conducting bonding glass compositions which are effective for the purpose of sealing ceramic-to-ceramic articles and ceramic-to-metal articles. More particularly, this invention relates to new devitrifiable sealing or solder glass compositions which are electrically conductive in nature.

One of the difficulties encountered in adding metallic silver powder to solder glass is that the solder glass properties change in such a manner that the resulting combination does not possess the desired characteristics necessary to effect a seal or bond. Since the primary use of solder glass is to join materials together, this deleterious effect seriously handicaps the range of application as applied to a "conductive" solder glass. The greatest drawback in adding silver to holder glasses is that the sintering and flow properties are changed. This results in a material that does not sinter as easily and hence does not produce a satisfactory seal at temperatures which would normally be adequate for a solder glass with no silver added. In essence, the silver increases devitrification, thereby making a mixture of silver and solder glass more difficult to form an effective seal since the mixture does not flow readily to form a smooth well-rounded fillet.

Accordingly, it is an object of this invention to provide a new and improved silver-containing solder glass which is electrically conductive. A further object of this invention is to provide a bonding composition which is not only conductive but produces effective seals. These and other objects of this invention will be apparent from the description which follows.

The novel compositions of this invention are formulated by mixing silver powder with solder glass to obtain the requisite conductivity, and including in the glass a small quantity of silver oxide to eliminate the deleterious side effects of the silver such as increased devitrification and insufficient flow whereby unsatisfactory seals are formed. Thus the method and composition of the invention will allow an essentially vitreous seal to be initially formed. With this invention, the presence of the metal without the corresponding oxide will result in such a high devitrification tendency or rate that the solder glass composition cannot effectively wet the surface to be sealed before it has undergone devitrification, as is well understood in the art. The composition of the invention can initially be formed in the glassy state and then, if desired, devitrified by further heating as shown by the examples of the invention set forth below.

Procedurally, as indicated in the examples, the glasses are melted without the metal but with all of the oxides including the oxide corresponding to the metal later to be employed, and the glasses are then pulverized and thoroughly mixed with the metal, such as the silver, also in powder or pulverized form. If desired, a liquid vehicle can be present when the two powders are mixed, such as an organic liquid, i.e., acetone or water, etc. The composition is then fired to give the coherent composition containing the conductive metal in intimate dispersion in the glass.

According to the invention, it has been found that the presence of silver oxide in lead borate glasses reduces the devitrification tendencies exhibited by lead borate glasses when fired in admixture with silver metal particles. Thus, if the silver metal is mixed with the same glass, but omitting the silver oxide, and the composition is fired, the silver has a pronounced effect in increasing the devitrification tendencies of the glass. The presence of the silver oxide minimizes this effect.

Lead borate compositions to which the invention is applicable include the following:

| Component: | Weight percent |
|---|---|
| PbO | 65–80 |
| $B_2O_3$ | 7–18 |
| ZnO | 0–14 |
| $SiO_2$ | 0– 4 |
| $Al_2O_3$ | 0– 3 |
| BaO | 0– 6 |
| $Ag_2O$ | 1– 3 |
| Ag | 4– 8 |

The present invention will be more completely understood by reference to the following examples. In each instance all parts and percentages are by weight, unless otherwise specified.

EXAMPLE I

*Solder Glass Composition I*

| | Percent |
|---|---|
| PbO | 83 |
| $B_2O_3$ | 10 |
| $Al_2O_3$ | 3 |
| $SiO_2$ | 4 |

The following "boat test" was made with the above composition. Pieces of a melted solder glass having the above composition were crushed in an iron mortar and sieved through a #180 screen. Any iron contamination was removed by a magnet. About 20 grams of the above-180 material was placed in a platinum liquidus boat and was distributed evenly along the bottom thereof. The boat and contents was transferred to a temperature gradient furnace for about 60 minutes and thereafter removed and cooled.

Three points were determined from the furnace gradient and the glass sample as follows:

(1) Break line
(2) Devitrification edge
(3) Glass edge

The glass range is the temperature difference between the devitrification edge and the glass edge.

The "break line" is a high temperature point above which little or no devitrification occurs. The "devitrification edge" is the minimum temperature at which devitrification occurs and the "glass edge" is the minimum temperature at which the powdered glass sinters to become glassy.

Composition I, when subjected to the above boat test, did not devitrify. The glass edge was 250° C. and the glass range was over 300° C.

EXAMPLE II

Composition II, which consists of composition I above to which 5% of silver powder has been added, was subjected to the same boat test described in Example I above. It was noted that the glass was completely devitrified through a temperature range of 357° to 602° C. Above 602° C. there was a glassy zone. There was no glass range below 602° C. This example demonstrates the devitrifying tendency of a solder glass in the presence of silver.

EXAMPLE III

Composition III, which was the same as the composition of Example I with a small amount of $Ag_2O$ added, was prepared and the same boat test was effected as described in Example I. The glass of composition III was as follows:

*Solder Glass Composition III*

| | Percent |
|---|---|
| PbO | 81.4 |
| $B_2O_3$ | 9.8 |
| $Al_2O_3$ | 2.9 |
| $SiO_2$ | 3.9 |
| $Ag_2O$ | 2.0 |

The glass edge was 330° C. and no devitrification occurred in the boat test. The glass range was thus in excess of 300° C.

EXAMPLE IV 100 parts by weight of powdered glass of composition III was intimately admixed with 5 parts by weight of silver powder and the boat test described in Example I was effected. The glass edge was 325° C. and the devitrification edge was 425° C., thus the glass range was 100° C. This example, compared to Example II, shows the inhibiting effect of silver oxide on the devitrification tendencies exhibited by silver metal. The composition was electrically conductive.

EXAMPLE V

*Solder Glass Composition V*

| | Percent |
|---|---|
| PbO | 74.7 |
| $B_2O_3$ | 8.5 |
| ZnO | 12.8 |
| $SiO_2$ | 2.0 |
| BaO | 2.0 |

The procedure of Example I was repeated, with solder glass composition V above and it was noted that the boat test resulted in a break line of 538° C., a devitrification edge of 403° C., and a glass edge of 328° C.

EXAMPLE VI

The procedure of Example V was repeated except that 5% of silver powder was added to solder glass composition V. In this instance the boat test results were: break line—588° C., devitrification edge—390° C., and glass edge—359° C.

It will be noted that the temperature range of glass formation is 328° to 403° C., or 75° in Example V, whereas with 5% silver being present as in the present example, the temperature range was diminished to 31° (390°–359°). In other words, the silver increases devitrification, making solder glasses which contain silver less effective for sealing purposes.

EXAMPLE VII

Composition VIII, which was the same as the composition of Example V with a small amount of $Ag_2O$ added, was prepared and the same boat test was effected as described in Example I. The glass of composition VII was as follows, rounding off the percentages to the nearest decimal point:

*Solder Glass Composition VII*

| | Percent |
|---|---|
| PbO | 73.3 |
| $B_2O_3$ | 8.3 |
| ZnO | 12.4 |
| BaO | 2.0 |
| $SiO_2$ | 2.0 |
| $Ag_2O$ | 2.0 |

The boat test was conducted by mixing 100 parts by weight of this glass with 5 parts by weight of silver powder and repeating the test of Example I. The glass edge was 340° C. and the devitrification edge was 380° C. Comparison of Example VI with Example VII shows that the glass range was increased from 31° to 40° C. by the presence of the silver oxide. The composition was electrically conductive.

EXAMPLE VIII

*Solder Glass Composition VIII*

| | Percent |
|---|---|
| PbO | 71.0 |
| $B_2O_3$ | 17.0 |
| ZnO | 9.0 |
| $Ag_2O$ | 3.0 |

The boat test, as described in Example I, was repeated and the results were as follows: break line—585° C., devitrification edge—438° C., and glass edge—367° C. In this example it will be noted that the temperature range of glass formation is 367° to 438° C., or 71° C.

EXAMPLE IX

The composition of Example VIII, but omitting the silver oxide, was calculated to be about 73.2% PbO, 17.5% $B_2O_3$, and 9.3% Zno. To 100 parts by weight of this three-component glass composition in powdered form were intimately admixed 5 parts by weight of silver powder and the boat test of Example I was repeated. The glass edge was 380° C. and the devitrification edge was 440° C., giving a glass range of 60° C.

EXAMPLE X

The procedure of Example VIII was repeated except to composition VIII there was intimately admixed 5% of silver powder. The boat test results, according to the procedure described in Example I, were as follows: break line—578° C., devitrification edge—435° C., and glass edge—368° C. It will be noted that the temperature range of glass formation is 368° to 435° C., or 67°, which is very comparable to Example VIII above, and indicates the manner in which the $Ag_2O$ decreases the tendency of silver powder per se to bring about devitrification. The composition was electrically conductive.

Compositions similar to Example X are especially useful for sealing parts with a conducting material, such as the funnel and faceplates of television tubes. Thus, such compositions are as follows:

*Composition (Mixture)*

| Component: | Weight percent |
|---|---|
| PbO | 65–70 |
| $B_2O_3$ | 15–17 |
| ZnO | 8–10 |
| Ag | 4–8 |
| $Ag_2O$ | 1–3 |

Especially satisfactory compositions of the invention are the following:

*Composition (Mixture)*

| Component: | Weight percent |
|---|---|
| PbO | 70–75 |
| $B_2O_3$ | 12–17 |
| ZnO | 8–10 |
| Ag | 4–8 (preferred 5–6) |
| $Ag_2O$ | 1–3 |
| $SiO_2$ | 0–3 |

When $SiO_2$ is present, it is usually preferred in amounts from 1–3 percent.

Moreover, it has been noted that the silver may be replaced by copper, iron, tin, bismuth and the silver oxide may be replaced by the corresponding oxides, namely, copper oxide, iron oxide, tin oxide, and bismuth oxide, respectively, in the compositions of the invention. In other words, copper is employed with copper oxide, iron with iron oxide, and so forth. However, the preferred metals are silver and copper and their corresponding oxides, silver and copper oxide, respectively.

It is to be understood that the above examples are merely illustrative and not restrictive. Moreover, the present invention may be susceptible of embodiment in other modified forms and that all such modifications which are similar or equivalent hereto come equally within the scope of the claims appended hereto.

This application is a continuation-in-part of Serial Number 842,225, filed September 25, 1959, now abandoned.

I claim:

1. A conducting lead borate glass composition consisting essentially of particles of a metal selected from the group consisting of Ag, Cu, Fe, Sn and Bi in intimate dispersion in a glass, the said composition containing 65–80% PbO, 7–18% $B_2O_3$, 0–14% ZnO, 0–4% $SiO_2$, 0–3% $Al_2O_3$, 0–6% BaO, 1–3% of an oxide of the selected metal, and 4–8% of said selected metal.

2. A conducting lead borate glass composition consisting essentially of particles of Ag in intimate dispersion in a glass, the said composition containing 65–80% PbO, 7–18% $B_2O_3$, 0–14% ZnO, 0–4% $SiO_2$, 0–3% $Al_2O_3$, 0–6% BaO, 1–3% $Ag_2O$ and 4–8% Ag.

3. A conducting solder glass composition consisting essentially of a solder glass containing 70–75% PbO, 12–17% $B_2O_3$, 8–10% ZnO, and 1–3% $SiO_2$; a conducting metal in the amount of 4–8% selected from the group consisting of silver, copper, iron, tin, and bismuth; and a corresponding oxide in the amount of 1–3% selected from the group consisting of silver oxide, copper oxide, iron oxide, tin oxide, and bismuth oxide.

4. A conducting solder glass composition consisting essentialy of a solder glass containing 70–75% PbO, 12–17% $B_2O_3$, 8–10% ZnO, and 1–3% $SiO_2$; a conducting metal ranging from 5–6% selected from the group consisting of silver, copper, iron, tin, and bismuth; and a corresponding oxide in the amount of 1–3% selected from the group consisting of silver oxide, copper oxide, iron oxide, tin oxide, and bismuth oxide, respectively.

5. A conducting solder glass composition comprising a solder glass containing 70–75% PbO, 12–17% $B_2O_3$, 8–10% ZnO, and 1–3% $SiO_2$, 4–8% silver as the conducting metal; and 1–3% silver oxide.

6. A conducting solder glass composition comprising a solder glass containing 70–75% PbO, 12–17% $B_2O_3$, 8–10% ZnO, and 1–3% $SiO_2$; 4–8% copper as the conducting metal; and 1–3% copper oxide.

7. A method of decreasing the devitrification tendencies caused by the presence of 4–8% of a metal in intimate admixture with a lead borate solder glass containing 65–80% PbO, 7–18% $B_2O_3$, 0–14% ZnO, 0–4% $SiO_2$, 0–3% $Al_2O_3$, and 0–6% BaO, which method consists of firing said lead borate glass with at least 1–3 weight percent of the oxide of said metal, said metal being selected from the group consisting of Ag, Cu, Fe, Sn and Bi.

8. A method of claim 7 wherein said metal is silver.

9. A conducting lead borate glass composition consisting essentially of particles of a metal selected from the group consisting of Ag, Cu, Fe, Sn and Bi in intimate dispersion in a glass, the said composition containing 65–70% PbO, 15–17% $B_2O_3$, 8–10% ZnO, 1–3% of an oxide of the selected metal, and 4–8% of said selected metal.

10. A conducting lead borate glass composition consisting essentially of particles of Ag in intimate dispersion in a glass, the said composition containing 65–70% PbO, 15–17% $B_2O_3$, 8–10% ZnO, 1–3% $Ag_2O$ and 4–8% Ag.

References Cited in the file of this patent

UNITED STATES PATENTS

| | | |
|---|---|---|
| 236,833 | Nichols | Jan. 18, 1881 |
| 2,457,158 | Koch | Dec. 28, 1948 |
| 2,530,217 | Bain | Nov. 14, 1950 |
| 2,569,773 | Orr | Oct. 2, 1951 |
| 2,615,816 | Dovey et al. | Oct. 28, 1952 |
| 2,931,142 | Veres | Apr. 5, 1960 |

FOREIGN PATENTS

| | | |
|---|---|---|
| 642,104 | Great Britain | Aug. 30, 1950 |